United States Patent
Ferrara et al.

(10) Patent No.: US 12,445,003 B2
(45) Date of Patent: Oct. 14, 2025

(54) ROTOR FOR A ROTARY ELECTRIC MACHINE

(71) Applicant: FERRARI S.P.A., Modena (IT)

(72) Inventors: Davide Ferrara, Modena (IT); Paolo Faverzani, Modena (IT); Luca Poggio, Modena (IT)

(73) Assignee: FERRARI S.P.A., Modena (IT)

( * ) Notice: Subject to any disclaimer, the term of this patent is extended or adjusted under 35 U.S.C. 154(b) by 263 days.

(21) Appl. No.: 18/323,454

(22) Filed: May 25, 2023

(65) Prior Publication Data
US 2023/0387738 A1   Nov. 30, 2023

(30) Foreign Application Priority Data
May 27, 2022  (IT) .................. 102022000011189

(51) Int. Cl.
*H02K 1/276* (2022.01)
*H02K 5/15* (2006.01)
*H02K 7/00* (2006.01)

(52) U.S. Cl.
CPC ............ *H02K 1/2766* (2013.01); *H02K 5/15* (2013.01); *H02K 7/003* (2013.01)

(58) Field of Classification Search
CPC .... H02K 1/2706; H02K 1/2713; H02K 1/272; H02K 1/2726; H02K 1/2733; H02K 1/274; H02K 1/2746; H02K 1/2753; H02K 1/276; H02K 1/2766; H02K 1/28; H02K 1/30; H02K 7/003
USPC .............. 310/156.12–156.14, 156.18–156.22
See application file for complete search history.

(56) References Cited

U.S. PATENT DOCUMENTS

| 2003/0011262 | A1 | 1/2003 | Joho | |
| 2005/0040721 | A1* | 2/2005 | Kusase | H02K 1/32 |
| | | | | 310/156.43 |
| 2008/0296997 | A1* | 12/2008 | Bando | H02K 1/276 |
| | | | | 310/261.1 |
| 2014/0111052 | A1 | 4/2014 | Wu et al. | |
| 2019/0181709 | A1* | 6/2019 | Berendes | H02K 1/30 |
| 2019/0181736 | A1* | 6/2019 | Fröhlich | H02K 9/19 |
| 2019/0356187 | A1* | 11/2019 | Fröhlich | H02K 5/06 |

(Continued)

FOREIGN PATENT DOCUMENTS

| CN | 109643924 A | * | 4/2019 | ............... H02K 1/30 |
| DE | 102012011002 A1 | | 12/2013 | |

(Continued)

OTHER PUBLICATIONS

CN109643924A (Year: 2019).*

(Continued)

*Primary Examiner* — Oluseye Iwarere
*Assistant Examiner* — Nicholas Lee Setzer
(74) *Attorney, Agent, or Firm* — CANTOR COLBURN LLP (57) ABSTRACT

A rotor for a rotary electric machine and having: a support cylinder, which has an outer surface and a central cavity; a plurality of permanent magnets, which are axially oriented, rest on the outer surface of the support cylinder and are arranged beside one another around a rotation axis to form a closed ring; and two side discs, which are fixed at the axially opposite ends of the support cylinder and are partially arranged inside the central cavity of the support cylinder.

13 Claims, 4 Drawing Sheets

(56) References Cited

U.S. PATENT DOCUMENTS

2021/0075293 A1* 3/2021 Peng .................. F16C 3/023
2021/0242735 A1* 8/2021 Ferrara ............... H02K 1/2753

FOREIGN PATENT DOCUMENTS

DE      102016117111 A1 *  3/2018  ............... H02K 1/28
DE      102020203483 A1    9/2021
WO      WO-2018029263 A1 * 2/2018  ........... H02K 15/028

OTHER PUBLICATIONS

WO_2018029263_A1 (Year: 2018).*
DE-102016117111-A1 translation (Year: 2018).*
Italian Search Report for Application No. 102022000011189; Filing Date: May 27, 2022; Date of Mailing—Jan. 18, 2023, 9 pages.

* cited by examiner

ROTOR FOR A ROTARY ELECTRIC MACHINE

CROSS-REFERENCE TO RELATED APPLICATIONS

This patent application claims priority from Italian patent application no. 102022000011189 filed on May 27, 2022, the entire disclosure of which is incorporated herein by reference.

TECHNICAL FIELD

The invention relates to a rotor for a rotary electric machine.

The invention finds advantageous application in a rotary electric machine for automotive powering, which is installed on board a vehicle and can be used as a motor (absorbing electrical energy and generating a mechanical torque) or as a generator (converting mechanical energy into electrical energy).

PRIOR ART

A rotary electric machine for automotive powering comprises a shaft, which is mounted in a rotary manner to rotate around a central rotation axis, a rotor, which generally has permanent magnets and is fitted to the shaft to rotate with the shaft, and a stator, which is arranged around the rotor to enclose, on the inside, the rotor.

Patent application US2003011262A1 discloses a rotor for a rotary electric machine, which has a central core with an inner space, permanent magnets being arranged on said core.

Patent application US2021242735A1 discloses a rotor for a rotary electric machine having a plurality of magnetic elements, which are arranged next to one another around the rotation axis to form a closed ring; each magnetic element consists of a plurality of permanent magnets, which are axially arranged one following the other according to a Halbach array.

Patent application DE102012011002A1 discloses a rotor for a rotary electric machine having a tubular central element and two flanged side parts fitted into the central element.

DESCRIPTION OF THE INVENTION

The object of the invention is to provide a rotor for a rotary electric machine, which has a particularly small mass and a particularly small rotational inertia.

According to the invention, there is provided a rotor for a rotary electric machine according to the appended claims.

The appended claims describe preferred embodiments of the invention and form an integral part of the description.

BRIEF DESCRIPTION OF THE DRAWINGS

The invention will now be described with reference to the accompanying drawings, showing a non-limiting embodiment thereof, wherein.

PREFERRED EMBODIMENTS OF THE INVENTION

Figure 1:
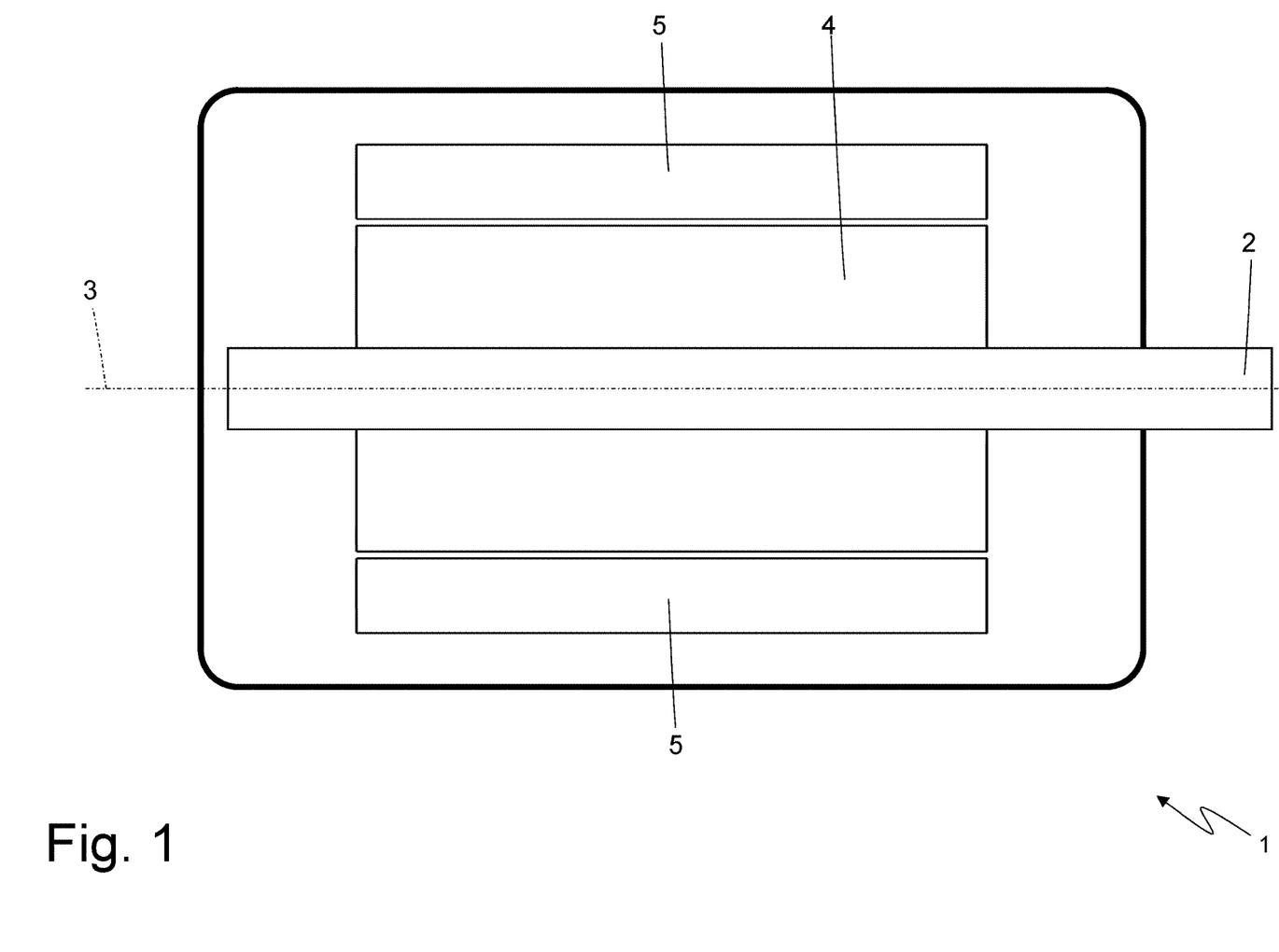
FIG. 1 is a schematic, longitudinal section view of a rotary electric machine provided with a rotor according to the invention.
Figure 2:
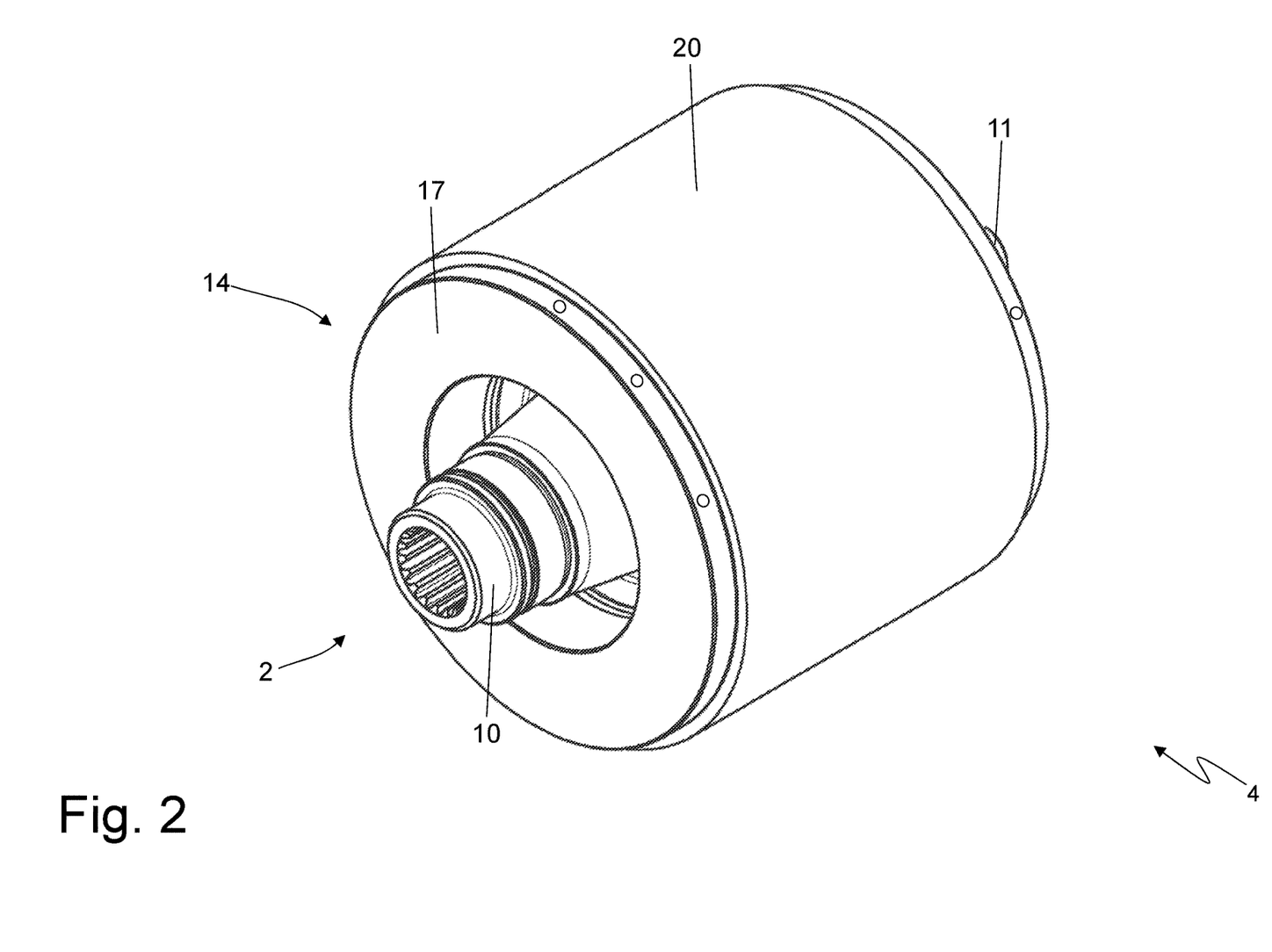
FIG. 2 is a perspective view of the rotor of FIG. 1.

In FIG. 1, number 1 indicates, as a whole, a synchronous electric machine for automotive powering, said electric machine being a reversible electric machine (i.e. an electric machine which can work both as an electric motor, absorbing electrical energy and generating a mechanical torque, and as an electric generator, absorbing mechanical energy and generating electrical energy).

The electric machine 1 is suited to be installed in an electric or hybrid drive vehicle comprising at least two drive wheels (namely, in a two-wheel-drive or four-wheel-drive electric or hybrid vehicle). In particular, the electric machine 1 can be connected to the drive wheels (directly or by means of a drivetrain possibly provided with a clutch); namely, between the electric machine 1 and the drive wheels there can be a direct connection, there can be a simple speed reducer or there can also be a connection/disconnection device (e.g. a clutch).

The electric machine 1 comprises a shaft 2, which is mounted in a rotary manner to rotate around a central rotation axis 3, a rotor 4 with permanent magnets, which is fitted to the shaft 2 to rotate with the shaft 2, and a stator 5 with a tubular, cylindrical shape, which is arranged around the rotor 4 to enclose, on the inside, the rotor 4 (alternatively, the rotor 4 could be arranged on the outside).

Between the rotor 4 and the stator 5 there is defined an air gap with an annular shape, which has a small thickness (normally, the bare minimum needed to allow the rotor 4 to rotate inside the stator 5 in total safety).

Figure 3:
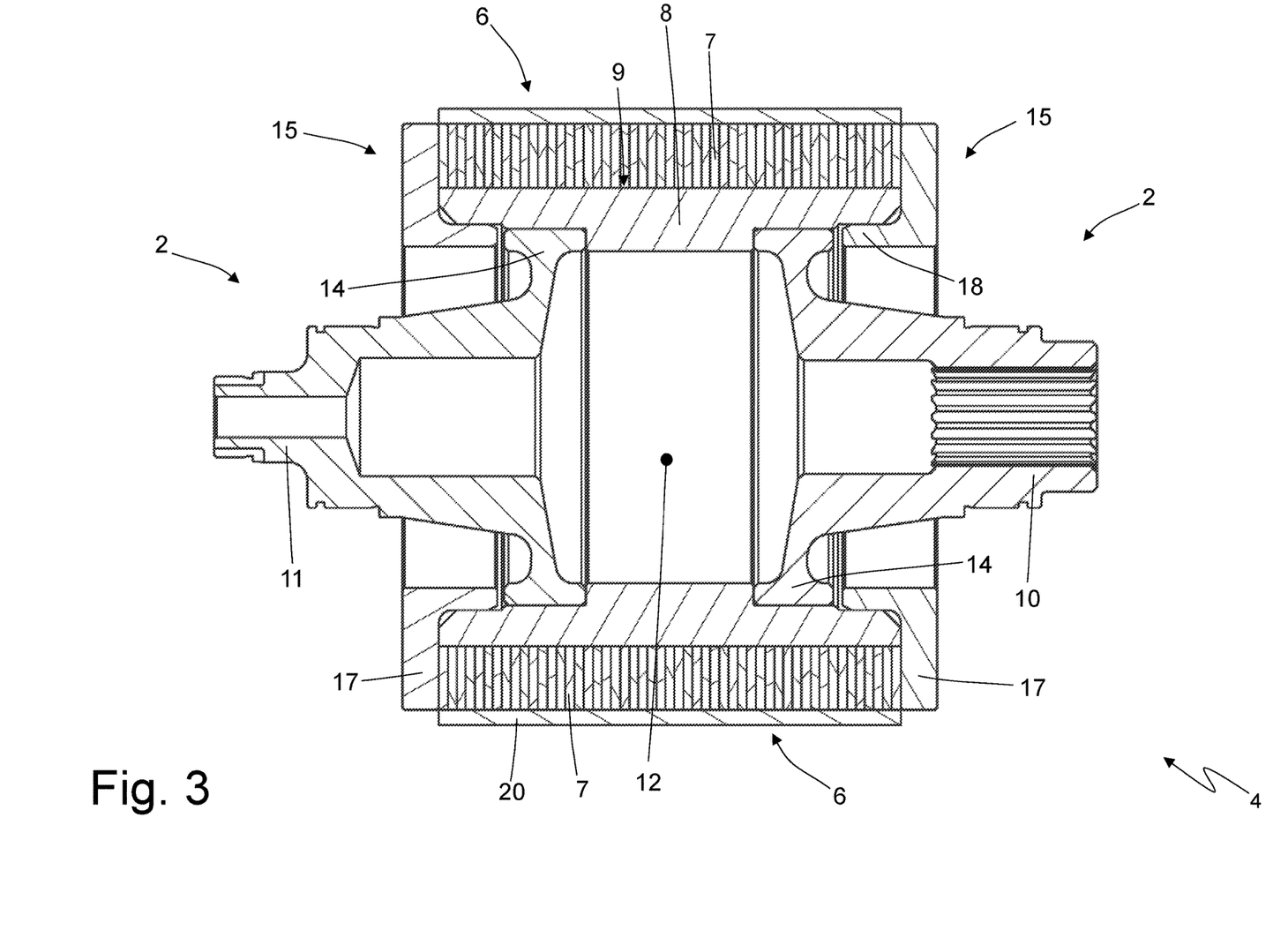
FIG. 3 is a longitudinal section view of the rotor of FIG. 1.
Figure 4:
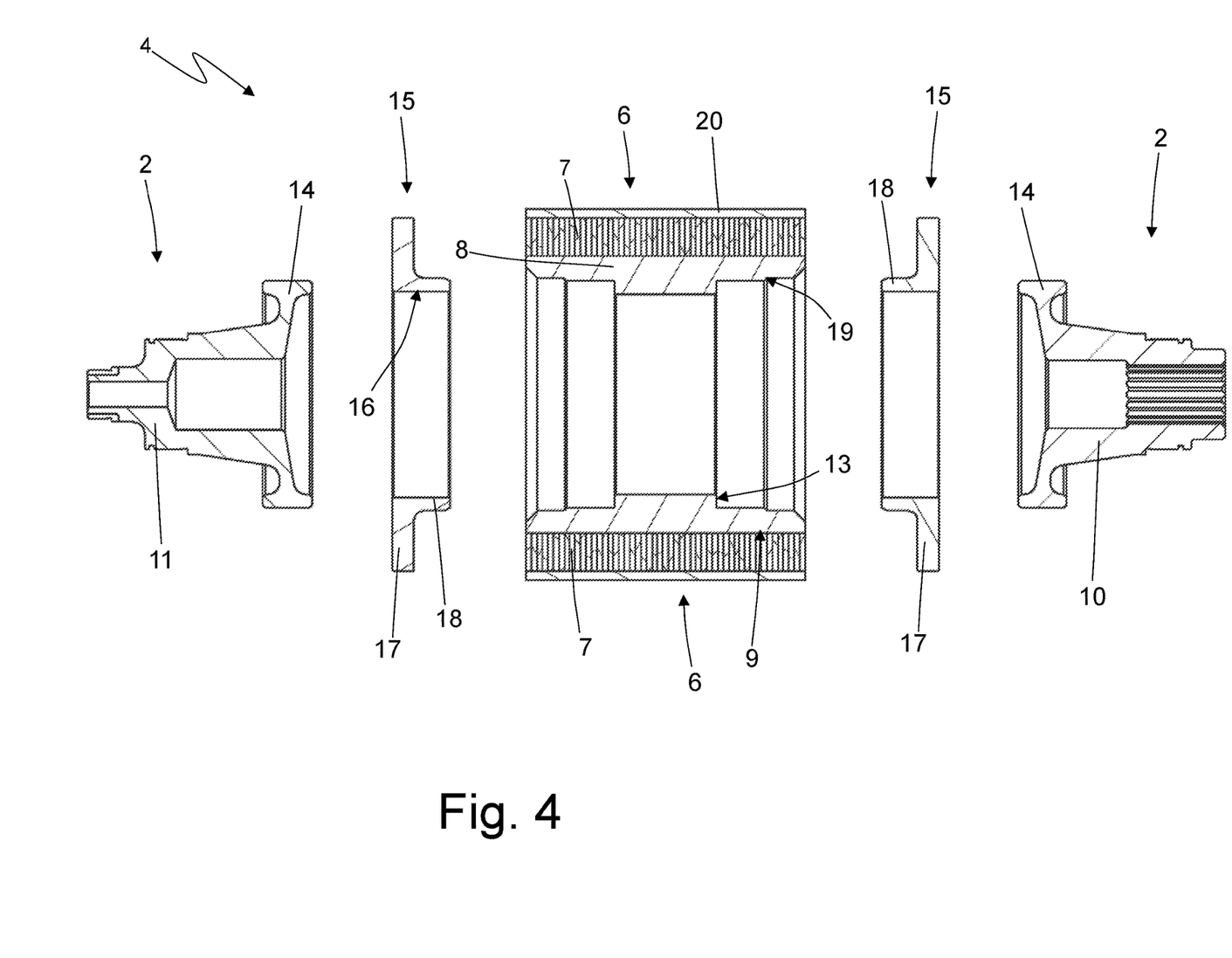
FIG. 4 is an exploded perspective view of the rotor of FIG. 1 with some parts left out for greater clarity.

According to FIGS. 3 and 4, the rotor 4 comprises a plurality of permanent magnets 6, which are axially oriented and are arranged beside one another around the rotation axis 3 to form a closed ring. The permanent magnets 6 have a superficial arrangement, namely they are arranged in the area of the outer surface of the rotor 4 and are not inserted in slots obtained in the rotor 4.

The succession of permanent magnets 6 building the closed ring entails a circumferential arrangement according to a Halbach array to nullify the magnetic field radially on the inside of the permanent magnets 6 and to maximize the magnetic field radially on the outside of the permanent magnets 6. In other words, the permanent magnets 6 are arranged to nullify the magnetic field radially on the inside of the permanent magnets 6 (towards the shaft 2) and to maximize the magnetic field radially on the outside of the permanent magnets 6 (towards the magnetic core of the stator 5). Namely, the permanent magnets 6 are circumferentially arranged one following the other according to a Halbach array to nullify the magnetic field radially on the inside of the permanent magnets 6 and to maximize the magnetic field radially on the outside of the permanent magnets 6.

A Halbach array is a special joining (arrangement) of the permanent magnets 6, which are arranged to augment the magnetic field on one side of the array (the radially outer side, in this embodiment) while cancelling (nullifying), through interference, the magnetic field on the opposite side (the radially inner side, in this embodiment). According to a preferred embodiment, the Halbach array entails cyclically repeating sets of four (or even larger sets of) permanent magnets 6: a permanent magnet 6 having a South-North orientation circumferentially arranged in a clockwise direction, a following permanent magnet 6 having a South-North orientation radially arranged towards the outside (namely, moving away from the central rotation axis 3), a following permanent magnet 6 having a South-North orientation circumferentially arranged in a counterclockwise direction, and a following permanent magnet 6 having a South-North orientation radially arranged towards the inside (namely, moving close to the central rotation axis 3).

According to a different embodiment, the permanent magnets 6 are not arranged according to a Halbach array.

According to a preferred embodiment, each permanent magnet 6 is not monolith-like (namely, consisting—since the very beginning—of one single piece of undivided and indivisible magnetic material), but is formed by an axial succession of permanent magnets 7 (smaller than the permanent magnet 6) axially lined up one behind the other, namely each permanent magnet 6 consists of a plurality of permanent magnets 7 (smaller than the permanent magnet 6), which are axially arranged one after the other; in particular, in each permanent magnet 6 there generally are twenty to sixty permanent magnets 7 lined up one behind the other.

In each permanent magnet 6, all permanent magnets 7 making up the permanent magnet 6 have the same identical orientation, namely they are all equally oriented from the point of view of the magnetic field; in other words, in a same permanent magnet 6, the permanent magnets 7 making up the permanent magnet 6 have the magnetic field oriented in the exact same manner.

In the embodiment shown in the accompanying figures, the permanent magnets 6 alternatively have a cross section with a rectangular shape and a cross section with the shape of an isosceles trapezium; according to a different embodiment which is not shown herein, the permanent magnets 6 all have the same cross section with the shape of an isosceles trapezium (obviously, with alternated orientations to build the ring).

According to FIGS. 3 and 4, the rotor 4 comprises a support cylinder 8, which houses the permanent magnets 6; in particular, the support cylinder 8 has an outer surface 9, on which the permanent magnets 6 rest. In other words, the permanent magnets 6 are superficially arranged on the outside of the support cylinder 8. According to a preferred embodiment, the outer surface 9 of the support cylinder 8 is faceted, namely consists of a plurality of flat surfaces, each providing a flat support for a corresponding permanent magnet 6.

The support cylinder 8 is coupled (namely constrained to be angularly integral) to the shaft 2 so that they form, together, one single block. According to a preferred embodiment, the shaft 2 consists of two half-shafts 10 and 11, each separate and spaced apart from the other one and singularly coupled (fixed) to the support cylinder 8; namely, each half-shaft 10 or 11 is independent of and separate from the other half-shaft 10 or 11 and is coupled (fixed) to the support cylinder 8 independently of the other half-shaft 10 or 11 (the two half-shafts 10 and 11 are not in contact, since they are arranged at a given distance from one another). In particular, the support cylinder 8 is internally hollow and has a central through cavity 12, into which the two half-shafts 10 and 11 get inserted. According to a preferred embodiment, each half-shaft 10 or 11 is driven, through interference (in particular, by means of a hot-cold coupling to obtain a high fastening force), into the support cylinder 8 (namely, into the central cavity 12 of the support cylinder 8).

According to a preferred embodiment, inside the central cavity 12 of the support cylinder 8 and in the area of the two ends there are obtained two annular abutments 13, against which the corresponding half-shafts 10 and 11 rest; namely, the two annular abutments 13 are limit stops (seats) for the insertion of the half-shafts 10 and 11 into the central cavity 12 of the support cylinder 8. In particular, each half shaft 10 or 11 internally ends with a mounting ring 14, which is driven into the central cavity 12 of the support cylinder 8 through interference and rests against the corresponding annular abutment 13.

The half-shaft 10 is shaped to be mounted on a support bearing; furthermore, the half-shaft 10 is also shaped to be connected to a transmission of motion and, therefore, has a splined machining. The half-shaft 11 is shaped to be mounted on another support bearing; furthermore, the half-shaft 11 is also shaped to be connected to an angular position sensor (in particular, to a resolver).

According to FIGS. 3 and 4, the rotor 4 comprises a pair of side discs 15 (also known as balancing discs), which are arranged around the shaft 2 at the two opposite ends of the support cylinder 8 and are designed (among other things) to contain and, if necessary, hold the permanent magnets 6 packed together. In other words, the two side discs 15 make up the two opposite ends of the rotor 4 and can keep the permanent magnets 6 axially compressed, to hold the permanent magnets 6 packed together.

According to a possible embodiment, the side discs 15 are designed to have balancing openings, which balance the rotor 4 around the rotation axis 3 and are manufactured by means of cylindrical drilling or by means of milling. In order to allow the rotor 4 to operate at high rotation speeds, ensuring, at the same time, a long operating life, the vibrations generated during the operation, which must be absorbed by the bearings supporting the shaft 2, need to be minimized. To this aim, the rotor 4 often needs to be finely balanced to reduce unbalances (due to unavoidable constructive tolerances), which generate vibrations during the rotation. In order to allow the rotor 4 to be balanced, the two side discs 15 are used, which act as balancing elements thanks to calibrated asymmetries of their mass generated by the balancing openings (which can be dead openings or through openings and can be arranged in a radial or axial manner).

The presence, the number, the arrangement and the depth of the balancing holes obviously are absolutely random and they can completely change from rotor 4 to rotor 4, as they depend on the actual unbalance (due to constructive tolerances) of the rotor 4 at the end of its manufacturing process. Theoretically speaking, a rotor 4 can be completely free from balancing holes, as, for a lucky combination of constructive tolerances, at the end its manufacturing process it is merely affected by an unbalance around the rotation axis 3 that is so small that it does not require corrections.

Each side disc 15 has, at the centre, a through hole 16, through which a corresponding half-shaft 10 or 11 is arranged (without contact). Furthermore, each side disc 15 consists of an outer ring 17 and an inner ring 18 (both centrally crossed by the same through hole 16), which form one single indivisible body without gaps. In each side disc the outer ring 17 has a greater diameter than a diameter of the inner ring 18, extends beyond the outer surface 9 of the support cylinder 8 and, hence, defines an axial containing member for the permanent magnets 6; on the other hand, in each side disc 15, the inner ring 18 is coupled (namely, constrained to be angularly integral) to the support cylinder 8 to form one single block. Namely, in each side disc 15, the outer ring 17 has the function of axially containing the permanent magnets 6 as well as a balancing function (i.e. the balancing openings are obtained on the outer ring 17), whereas the inner ring 18 serves as a mechanical coupling to the support cylinder 8.

According to a preferred embodiment, each side disc 15 is driven, through interference (in particular, by means of a hot-cold coupling to obtain a high fastening force), into the support cylinder 8 (namely, into the central cavity 12 of the support cylinder 8) next to a corresponding half-shaft 10 or 11 and radially more on the outside than the corresponding half-shaft 10 or 11. According to a preferred embodiment, inside the central cavity 12 of the support cylinder 8 and in the area of the two ends there are obtained two annular abutments 19, against which inner rings 18 of the corresponding side discs 15 rest; namely, the two annular abutments 19 are limit stops (seats) for the insertion of the inner rings 18 of the corresponding side discs 15 into the central cavity 12 of the support cylinder 8. Each annular abutment 19 is axially arranged more on the outside than a corresponding annular abutment 13 and has a larger diameter than a diameter of the corresponding annular abutment 13.

According to a preferred embodiment, the side discs 15 axially strike against the support cylinder 8; namely, the side discs 15 axially "touch" the support cylinder 8 and not the permanent magnets 6 to axially press directly against the support cylinder 8, instead of pressing against the permanent magnets 6.

Owing to the disclosure above, it is evident that the two half-shafts 10 and 11 are independent of and separate from one another and also are independent of and separate from the respective side discs 15; furthermore, the two half-shafts 10 and 11 are singularly inserted in opposite ends of the central cavity 12 of the support cylinder 8, independently of the respective side discs 15, to form one single block with the support cylinder 8. Each side disc 15 has, at the centre, a through hole, through which a corresponding half-shaft 10 or 11 is arranged with a clearance, namely without mutual contact. According to a preferred embodiment, each side disc 15 has no point of contact (either axially or radially) with the corresponding half-shaft 10 or 11; namely, between each side disc 15 and the corresponding half-shaft 10 or 11 there is no point of contact either in axially oriented surfaces or in axially oriented surfaces.

The rotor 4 comprises a cylindrical containing element which is internally hollow and is arranged around the permanent magnets 6 to hold the permanent magnets 6 in contact with the support cylinder 8; namely, the containing element 20 covers the permanent magnets 6 on the outside to provide a radial containing of the permanent magnets 6 in order to prevent a centrifugal force from pushing the permanent magnets 6 against the magnetic core of the stator 5. According to a preferred embodiment, the containing element 20 consists of a tubular element of made of a composite material, which is driven around the permanent magnets 6 through interference. Alternatively, the containing element 14 is made of a plastic material, a light, non-ferromagnetic metal material (for example, aluminium, titanium or magnesium) or (but less probably) a ferromagnetic metal material. As further alternative, the containing element 20 consist of a resin-bonded filament wound in a spiral around the permanent magnets 6.

According to a possible embodiment, the containing element 20 is consists of one single monolith-like piece (namely, without gaps). Alternatively, the containing element 20 consists of two or more pieces, which are separate from and independent of one another and are arranged beside one another; in this embodiment, the different pieces making up the containing element 20 are singularly fitted around the permanent magnets 6 reducing the overall force needed for the operation (which, as mentioned above, takes place with a given interference).

Generally speaking, the half-shaft 10 is made of high-resistance steel (or another equivalent material in terms of mechanical features), since it has to be able to transmits the torque generated or absorbed by the rotor 4; on the other hand, the half-shaft 11 is made of steel or another metal material having a smaller resistance than the steel of the half-shaft 10, since the half-shaft 11 does not transmit the torque generated or absorbed by the rotor 4.

The support cylinder 8 is made of a ferromagnetic metal material (steel), of a non-magnetic material (such as, for example, stainless steel, aluminium, titanium or magnesium) or even of a non-metal material (typically, a composite material, such as carbon fibre, in order to have the necessary resistance). As mentioned above, the magnetic field inside the permanent magnets 6 is null due to the Halbach array of the permanent magnets 6 and, therefore, the support cylinder 8 is not affected by a significant magnetic field; as a consequence, the support cylinder 8 does not necessarily need to have ferromagnetic properties. The support cylinder 8 made of a magnetic metal material simplifies the assembly of the rotor 4, since the permanent magnets 6 adhere, through magnetic attraction, to the outer surface 9 of the support cylinder 8 and, hence, during the assembly, they can more easily be arranged on the outer surface 9 of the support cylinder 8.

The side discs 15 are normally made of non-magnetic stainless steel to have the necessary resistance, allow for a correct balancing of the rotor 4 (the side discs 15 must have a given mass in order to be able to ensure an effective balancing action due to the removal of material from the side discs 15) and, at the same time, not to disturb the magnetic field generated by the permanent magnets 6.

According to a possible embodiment, in each permanent magnet 6, the single permanent magnets 7 are glued to one another through the interposition of a mounting glue (which is an electric insulator) to reduce power losses due to parasite currents. In other words, each permanent magnet 6 is obtained by gluing the single permanent magnets 7 to one another by means of the mounting glue (which is an electric insulator).

According to a preferred embodiment, the permanent magnets 6 are directly mounted in the outer surface 9 of the support cylinder 8; in particular, each permanent magnet 6 is glued to the outer wall 9 of the support cylinder 8 by means of a mounting glue, which preferably is an electric insulator (to avoid "short-circuiting" the different permanent magnets 7 of a same permanent magnet 6 through the outer wall 9 of the support cylinder 8). In other words, between the outer wall 9 of the support cylinder 8 and the permanent magnet 6 there is interposed an electrically insulating layer built by the mounting glue.

The mounting glue has the function of electrically insulating the permanent magnets 6 from the outer wall 9 of the support cylinder 8 lying underneath and especially has the function of connecting the permanent magnets 6 to the outer wall 9 of the support cylinder 8 while building the rotor 4 (the mechanical holding of the permanent magnets 6 is ensured by the containing element 20, since the mounting glue is not capable of resisting a centrifugal force when the rotor 4 rotates at a high speed).

The embodiments described herein can be combined with one another, without for this reason going beyond the scope of protection of the invention.

The rotor 4 described above has numerous advantages.

First of all, the rotor 4 described above has both a small mass and a low rotational inertia, to the advantage of performances (in particular, the small rotational inertia reduces dynamic stresses on the entire drivetrain).

Furthermore, the rotor 4 described above uses innovative materials (in particular, composite materials), which ensure a performance-mass ratio that was never reached before. In particular, the rotor 4 described above uses different materials for the main parts (support cylinder 8, half-shaft 10, half-shaft 11, side discs 15) making up the rotor 4; in this way, each main part (support cylinder 8, half-shaft 10, half-shaft 11, side discs 15) can be made of the material most suited to resist the mechanical stresses generated in use and to optimize the performance/mass ratio. In particular, the side (balancing) discs 15 can be made of non-magnetic materials with smaller mechanical properties.

The rotor 4 disclosed above features a significant mass and inertia reduction also thanks to the simplified connection of the side discs 15 to the support cylinder 8, since all additional mechanical connections (such as, for example, a welding) of the two side discs 15 to the support cylinder 8 are eliminated, for the side discs 15 are driven into the central cavity 12 of the support cylinder 8 through interference.

In the rotor 4 disclosed above, the mechanical connection between the side discs 15 and the support cylinder 8, despite being very simple and light, also ensures great stability and safety, since the centrifugal force acting during the rotation of the rotor 4 pushes the inner rings 18 of the side discs 15 against the support cylinder 8 and, hence, tends to reinforce (instead of weakening) the connection thereof. As a consequence, this solution is especially suited for manufacturing rotors 4 with a large diameter, in which the centrifugal force acting upon the side discs 15 reaches particularly high values.

The rotor 4 described above ensures a high energy efficiency (namely, a high efficiency between the inputted mechanical or electrical power and the outputted electrical or mechanical power); to this regard, it should be pointed out that the presence of the containing element 20, for it ensures a high radial positioning and circularity precision, minimizes the air gap existing between the rotor 4 and the stator 5.

Finally, the rotor 4 described above is simple to be manufactured, as it consists of a small number of components with a simple shape, which can be quickly combined with one another even in automatic processes.

LIST OF THE REFERENCE NUMBERS OF THE FIGURES 1 electric machine
2 shaft
3 rotation axis
4 rotor
5 stator
6 permanent magnets
7 permanent magnets
8 support cylinder
9 outer surface
10 half-shaft
11 half-shaft
12 central cavity
13 annular abutments
14 mounting ring
15 side disc
16 through hole
17 outer ring
18 inner ring
19 annular abutments
20 containing element

The invention claimed is:

1. A rotor (4) for a rotary electric machine (1) and comprising:
   a support cylinder (8), which has an outer surface (9) and a central cavity (12);
   a plurality of main permanent magnets (6), which rest on the outer surface (9) of the support cylinder (8) and are arranged beside one another around a rotation axis (3) to form a closed ring;
   two side discs (15), which are fixed at the axially opposite ends of the support cylinder (8) and are each partially arranged inside the central cavity (12) of the support cylinder (8); and
   two half-shafts (10, 11), which are independent of and separate from one another;
   wherein the two half-shafts (10, 11) are independent of and separate from the respective side discs (15) and are singularly inserted in opposite ends of the central cavity (12) of the support cylinder (8), independently of the respective side discs (15), to form one single block with the support cylinder (8); and
   wherein each side disc (15) has, at the centre, a through hole, through which a corresponding half-shaft (10, 11) is arranged with a clearance, namely without mutual contact.

2. The rotor (4) according to claim 1, wherein each side disc (15) has no point of contact with the corresponding half-shaft (10, 11).

3. The rotor (4) according to claim 1, wherein each side disc (15) consists of an outer ring (17) and of an inner ring (18), which form one single indivisible body without gaps.

4. The rotor (4) according to claim 3, wherein the inner ring (18) of each side disc (15) has a smaller diameter than a diameter of the outer ring and is arranged inside the central cavity (12) of the support cylinder (8) to obtain a mechanical connection to the support cylinder (8).

5. The rotor (4) according to claim 4, wherein the central cavity (12) of the support cylinder (8) has two first annular abutments (19), against which the inner rings (18) of the corresponding side discs (15) rest.

6. The rotor (4) according to claim 3, wherein the outer ring (17) of each side disc (15) has a larger diameter than a diameter of the inner ring (18), extends past the outer surface (9) of the support cylinder (8) and defines an axial containment for the main permanent magnets (6).

7. The rotor (4) according to claim 1, wherein:
   each half-shaft (10, 11) is press-fitted into the central cavity (12) of the support cylinder (8) through interference; and
   each side disc (15) is press-fitted into the central cavity (12) of the support cylinder (8) through interference separately from and independently of the respective half-shaft (10, 11).

8. The rotor (4) according to claim 7, wherein:
   the central cavity (12) of the support cylinder (8) has two first annular abutments (19), against which inner rings (18) of the corresponding side discs (15) rest; and
   the central cavity (12) of the support cylinder (8) has two second annular abutments (13), against which the corresponding half-shafts (10, 11) rest.

9. The rotor (4) according to claim 8, wherein each first annular abutment (19) is axially arranged more on the outside than a corresponding second annular abutment (13)

and has a larger diameter than a diameter of the corresponding second annular abutment (13).

10. The rotor (4) according to claim 1, wherein a first half-shaft (10) is made of a different material than a material making up a second half-shaft (11).

11. The rotor (4) according to claim 1, wherein the support cylinder (8) is made of a different material than the materials making up the two half-shafts (10, 11).

12. The rotor (4) according to claim 1, wherein the support cylinder (8) is made of a different material than the material making up the two side discs (15).

13. The rotor (4) according to claim 1, wherein each main permanent magnet (6) consists of a plurality of secondary permanent magnets (7), which are axially arranged one following the other.

* * * * *